(12) United States Patent
Heriz Agiriano et al.

(10) Patent No.: US 8,454,304 B2
(45) Date of Patent: Jun. 4, 2013

(54) BEARING SUPPORT STRUCTURE FOR TURBINE

(75) Inventors: Jon Heriz Agiriano, Gatika (ES); Raúl Vázquez Díaz, Las Rozas (ES); David Cadrecha Robles, Torrejon de Ardoz (ES); Sergio Moñux Rodrigo, Durango (ES); Erlantz Cristobal Camio, Bilbao (ES)

(73) Assignee: Industria de Turbo Propulores, S.A., Zamudio (Vizcaya) (ES)

( * ) Notice: Subject to any disclaimer, the term of this patent is extended or adjusted under 35 U.S.C. 154(b) by 640 days.

(21) Appl. No.: 12/612,233

(22) Filed: Nov. 4, 2009

(65) Prior Publication Data
US 2010/0111690 A1    May 6, 2010

(30) Foreign Application Priority Data
Nov. 4, 2008    (ES) .................................. 200803145

(51) Int. Cl.
*F04D 29/04*    (2006.01)
(52) U.S. Cl.
USPC ........ 415/142; 415/154.2; 415/155; 415/159; 415/209.4; 415/210.1
(58) Field of Classification Search
USPC .................. 415/115, 142, 153.2, 154.2, 155, 415/159, 208.1, 209.4, 210.1, 211.2
See application file for complete search history.

(56) References Cited

U.S. PATENT DOCUMENTS

| | | | | |
|---|---|---|---|---|
| 3,319,930 | A * | 5/1967 | Howald | 415/190 |
| 4,989,406 | A * | 2/1991 | Vdoviak et al. | 60/762 |
| 5,411,370 | A * | 5/1995 | Varsik | 415/209.4 |
| 5,740,674 | A * | 4/1998 | Beutin et al. | 60/226.1 |
| 6,358,001 | B1 * | 3/2002 | Bosel et al. | 415/142 |
| 7,052,234 | B2 * | 5/2006 | Wells et al. | 415/137 |
| 7,600,970 | B2 * | 10/2009 | Bhate et al. | 415/191 |

* cited by examiner

*Primary Examiner* — Igor Kershteyn
(74) *Attorney, Agent, or Firm* — Merchant & Gould P.C.

(57) ABSTRACT

Bearing support structure for turbines comprising an inner ring (1) and an outer ring (2) radially connected by means of structural vanes (5) and aerodynamic vanes (6) in a circumference-like arrangement between both rings (1, 2). The aerodynamic vanes (6) are thinner and lighter than the structural vanes (5), and the number of structural vanes (5) depends exclusively on the loads of the bearing (3) housed in the structure to be transmitted to the anchoring points (7) of the engine assembly located in the outer ring (2), and on the amount of service fluids which must go through between the inner ring (1) and the outer ring (2), while the number of aerodynamic vanes (6) and their section depends exclusively on the aerodynamic requirements demanded from the support structure for the straightening of the turbine main flow. Thus, the structural vanes (5) fulfill only structural functions and the aerodynamic vanes (6) fulfill only aerodynamic functions.

20 Claims, 4 Drawing Sheets

BEARING SUPPORT STRUCTURE FOR TURBINE

This application claims benefit of Serial No. 200803145, filed 4 Nov. 2008 in Spain and which application is incorporated herein by reference. To the extent appropriate, a claim of priority is made to the above disclosed application.

TECHNICAL FIELD OF THE INVENTION

The present invention refers to the technical field of turbines, specifically to the elements and configuration of gas turbines, and more specifically to structural support and rotation elements of turbines, and to the optimization thereof to improve the aerodynamics of the assembly, separating the strictly structural function from the aerodynamic one.

BACKGROUND OF THE INVENTION

For the housing of bearings in gas turbines, radial structures are used, where said bearings are housed inside them, and the turbine is fixed to its outer part. These structures are formed by an inner ring where the bearing is housed and an outer ring where the turbine anchoring points and the fastening points of the engine assembly are, which includes the turbine. Nowadays, the inner ring and the outer ring of these radial structures are joined together by a set of blades or vanes, with an aerodynamic function to straighten and direct the incoming flow in the most appropriate form, a structural function to transmit the bearing loads to the anchoring points of the turbine arranged in the outer ring, and to allow the passage of service fluids such as oil or air between the outside and the inside of the main fluid with a minimum aerodynamic impact. Therefore, some of the vanes must be hollow, so as to allow the passage of fluids through their interior. Therefore, the number of vanes needed between the inner ring and the outer ring is determined by the level of loads to be transmitted between the bearing and the turbine, the quantity and variety of service fluids needed, and the aerodynamic requirements. This configuration presents a series of disadvantages derived from the fact that since the number of vanes depends on so many and so different factors, it is not possible to optimize the number, form and section of said vanes without sacrificing some of the factors, for example, an improvement in the support function will worsen the aerodynamic properties, and vice versa. That is, if all vanes are the same it will not be possible to optimize all functions at the same time, instead, one of them will always be sacrificed to the others.

Therefore, a support structure is needed which attains an efficient turbine operation, and simultaneously improves all functions of the structure, avoiding the existing inconveniences in the previous systems of the state of the art.

SUMMARY OF THE INVENTION

The present invention solves the existing problems of the state of the art by means of a bearing support structure for a turbine, specifically for the rear bearing of a gas turbine. This support structure is formed by an inner ring, where the bearing is housed and an outer ring comprising in its outer perimeter some fastening points to the turbine and anchoring points to the engine assembly. In the present invention, the inner ring and the outer ring are radially connected by means of a series of vanes in a circumference-like arrangement between both rings, divided in structural vanes and aerodynamic vanes. The former will be in charge of support and load transmission functions exclusively between the bearing and the anchoring points of the engine assembly, in the outer ring, and the function of service fluid passage, such as oil or air between the outside and the inside of the turbine operation fluid, that is why, they will be hollow. The latter, the aerodynamic ones, however, will be lighter than the structural vanes, and they will be in charge of aerodynamic functions exclusively, such as straightening the main flow of the turbine operation.

Thus, the number of structural vanes in a circumference-like arrangement between the inner ring and the outer ring depends exclusively on the loads to be transmitted from the bearing to the anchoring points of the engine assembly in the outer ring, and on the amount of service fluids which have to travel between the inner ring and the outer ring, and the number of aerodynamic vanes and their section depends exclusively on the aerodynamic requirements demanded from the support structure for the straightening of the turbine main flow.

With this separation of mechanical and aerodynamic functions by dividing vanes into structural and aerodynamic ones, it is attained the optimization of the mechanics and aerodynamics simultaneously, acting on the structural and aerodynamic vanes, respectively.

According to different embodiments of the invention, the aerodynamic vanes, which are the ones which will enable the turbine aerodynamic optimization, can be joined to the inner ring, to the outer one, or both, through different joining systems, in order to attain a firm union, which also provides the necessary aerodynamic properties to the structure.

One of these joining systems consists of using at least a two-wing metallic flat bar with an L-section, where one of the wings is joined to the aerodynamic vane and the other wing is joined to the corresponding ring. The aerodynamic vanes are joined to each one of the rings through at least one metallic flat bar. According to different embodiments, a flat bar can be used to join the vane to the inner ring and the other flat bar can be used to join the vane to the outer ring, or more than one flat bar for the union of the vane to each one of the rings. Preferably, two metallic flat bars are used, placing one of them at each side of the aerodynamic vane, creating a steadier and more secure union.

According to a particular embodiment of these unions through metallic flat bars, the aerodynamic vanes are joined through the flat bar to both rings, both the inner and the outer one, firmly being fixed to one of them and simply resting against the flat bar wing in the other. In this way, the fixing to the structure is efficiently attained, and furthermore the vanes will have certain mobility, favoring the effort release and improving aerodynamic properties.

According to an alternative embodiment, the aerodynamic vanes are fixed only to one of the rings, through a couple of metallic flat bars, leaving the other end of the vane free, which further favors its movement, for cases in which it is necessary.

Besides the metallic flat bars, there exist other systems for the union of aerodynamic vanes to the rings, such as grouping the aerodynamic vanes between two structural vanes through a membrane in one of its ends, which is fixed to one of the rings, or through two membranes, each one of them being fixed to one of the vane ends. These membranes can be joined to the rings in a rigid or detachable manner, through flanges, or they can be built-in with the other rings. It is also possible that, instead of the two membranes joining the rings, only one of them joins one of the rings, the other one remaining free, thus one of the ends being free to move.

The aerodynamic vanes can be contiguous or they can be partitioned, or divided into two parts, preferably by its central area, so that one of the parts is joined to the inner ring and the other part is joined to the outer ring.

BRIEF DESCRIPTION OF THE DRAWINGS

For a better understanding of the invention, the following is an illustrative non-limiting description of an embodiment of the invention making reference to a series of drawings.

Figure 1:
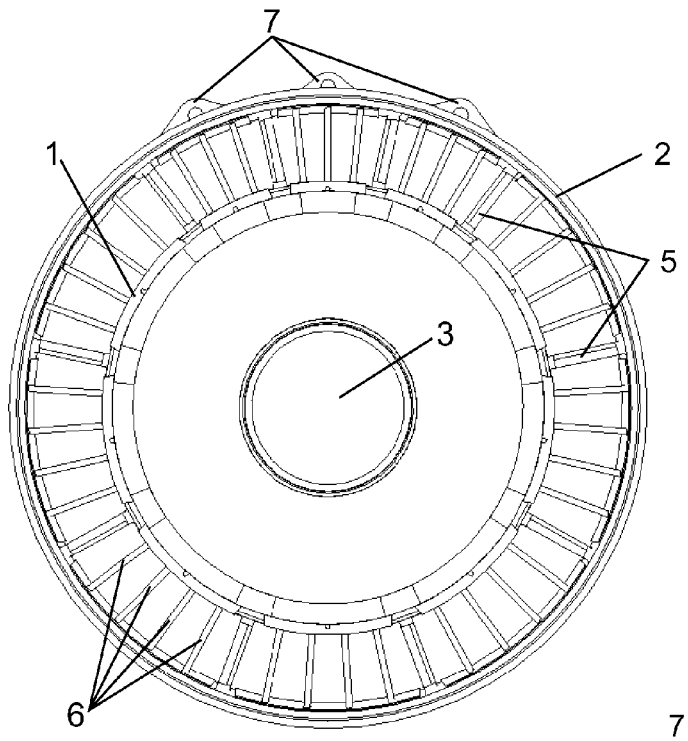
FIG. 1 is a front view of the structure object of the present invention, with the circumference-like arrangement between the inner and outer ring of the differentiated structural and aerodynamic vanes.

In these figures, reference is made to the following set of elements:
1. inner ring
2. outer ring
3. Bearing
4.
5. structural vanes
6. aerodynamic vanes
7. anchoring points of the engine assembly
8. metallic flat bars
9. first wing of the metallic flat bars
10. second wing of the metallic flat bars
11. aerodynamic vanes packages
12. inner membrane
13. outer membrane
14. flanges

DETAILED DESCRIPTION OF THE PREFERRED EMBODIMENTS

Figure 2:
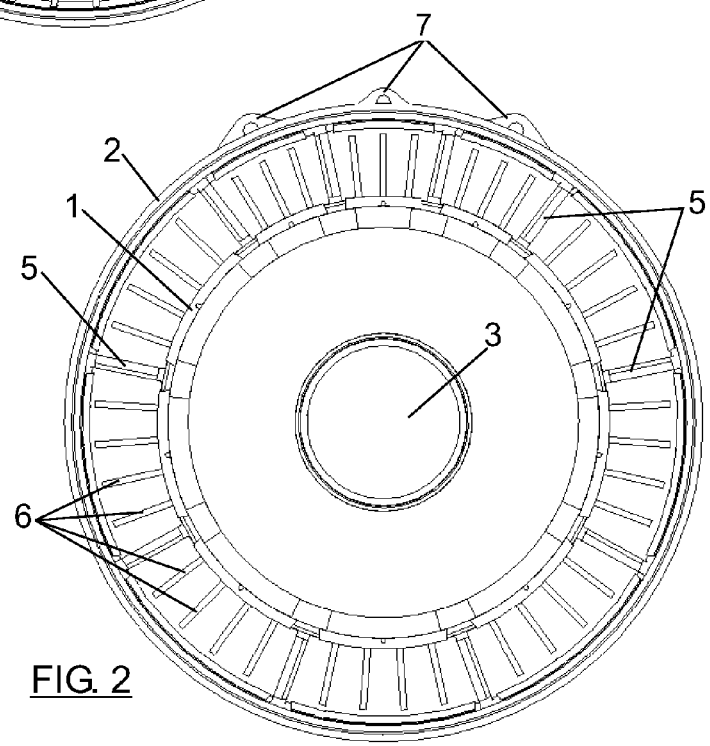
FIG. 2 is a front view of the structure object of the present invention, in which the aerodynamic vanes are joined only to the inner ring.
Figure 8:
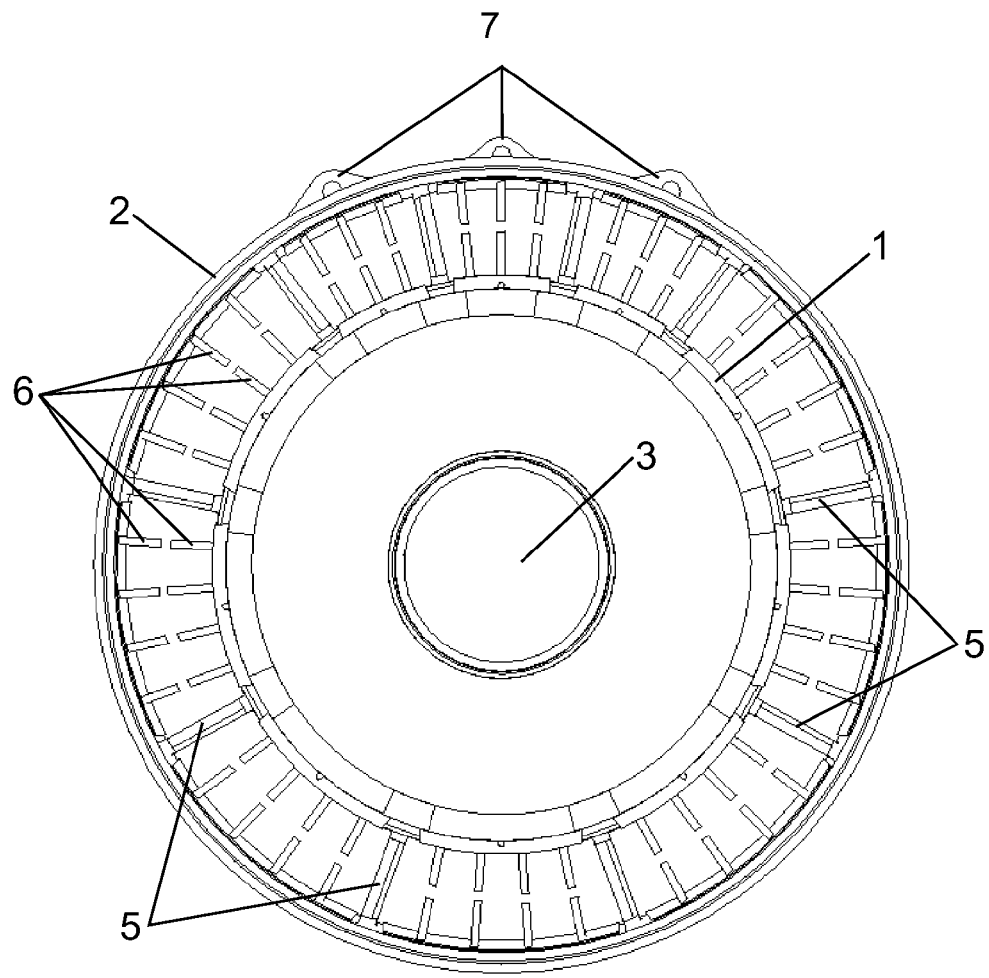
FIG. 8 is a front view of a structure, in which according to a particular embodiment the aerodynamic vanes are divided into two parts, one of the parts being joined to the inner ring and the other part, to the outer ring.

As it can be seen in the drawings, particularly in FIGS. 1, 2 and 8, the object of the present invention is a bearing support structure for turbines, specifically gas turbines, formed by an inner ring 1, where the bearing 3 is housed for the rotation of the turbine, and an outer ring 2, which in its outer perimeter has anchoring points 7 of the engine assembly including a turbine. The inner 1 and outer ring 2 are connected by a plurality of vanes 5, 6, radially placed in a circumferential arrangement between them.

These vanes 5, 6 are divided into structural vanes 5 and aerodynamic vanes 6. The structural vanes 5 are in charge of transmitting the bearing 3 loads to the anchoring points 7 of the engine assembly which are in the outer ring 2, and of being the passage of service fluids, such as air, water or oil being between the inner ring 1 and the outer ring 2. The aerodynamic vanes 6 are in charge of providing the aerodynamic requirements to the structure, such as for example, straightening the main flow of the turbine operation. Due to the difference between the function of both types of vanes 5, 6, the aerodynamic vanes 6 are lighter than the structural vanes 5.

In the present bearing support structure for turbines, the mechanical or structural function and the aerodynamic one are totally separate, that is, the structural vanes 5 only fulfill structural functions and the aerodynamic vanes 6 only fulfill aerodynamic functions.

Therefore, the number of structural vanes 5 placed between the inner ring 1 and the outer ring 2 depends exclusively on the loads to be transmitted between the bearing 3 and the anchoring points 7 of the engine assembly located in the outer ring 2, and on the quantity and type of service fluids which need to go through between the inner ring 1 and the outer ring 2, while the number of aerodynamic vanes 6 and their section depend exclusively on the aerodynamic requirements demanded by the support structure for the straightening of the main flow of the turbine operation.

According to different particular embodiments of the invention, the aerodynamic vanes 6 can be joined at one of its ends to the inner ring 1, or at the other end to the outer ring 2, or they can be joined to both rings 1, 2. FIG. 2 shows an embodiment where the aerodynamic vanes are only joined to the inner ring 1.

For the union of the aerodynamic vanes 6 to the rings there exist several methods.

Figure 3:
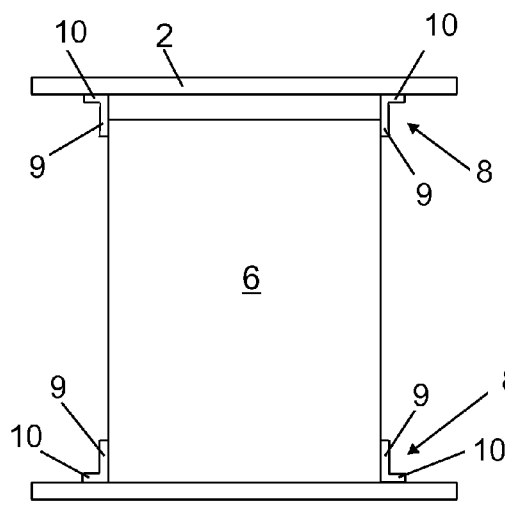
FIG. 3 is a detailed view of the union of an aerodynamic vane to the inner ring and to the outer ring of the structure according to a particular embodiment, through metallic flat bars.

A preferred embodiment of these union means consists of at least a metallic flat bar 8, which is formed by a first wing 9 which is connected to the aerodynamic vane 6, and a second wing 10 rigidly joined to the ring 1, 2. The aerodynamic vanes 6 are joined to the rings 1, 2 through at least one of these metallic flat bars 8, it being possible to use one metallic flat bar 8 for the union of the aerodynamic vane 6 to each one of the ring, or more than one metallic bar. FIG. 3 shows that preferably a couple of these metallic flat bars 8 are used, placing one at each side of the aerodynamic vanes 6. FIG. 3 shows that preferably each one of the aerodynamic vanes 6 is joined at one of its ends to the inner ring 1 through a couple of metallic flat bars 8, and at its other end to the outer ring 2 through another couple of metallic flat bars 8. In this case, the first wings 9 of the flat bars 8 joining the aerodynamic vanes 6 to the inner ring 1 are rigidly fixed to the aerodynamic vanes 6, while the first wings 9 of the flat bars 8 joining the aerodynamic vanes 6 to the outer ring 2 only rest against said aerodynamic vanes 6, offering certain degree of mobility which will favor tension release and a better position of the vane 6 as regards aerodynamic properties. According to an alternative embodiment, the first wings 9 of the flat bars 8 joining the aerodynamic vanes 6 to the outer ring 2 are the ones rigidly fixed to the aerodynamic vanes 6, while the first wings 9 of the flat bars 8 joining the aerodynamic vanes 6 to the inner ring 1 are the ones that only rest against said aerodynamic vanes 6. This embodiment is similar to the previous one, except in that the mobility is produced in the proximity of the inner ring 1 and not of the outer ring 2.

According to another embodiment of the invention, the aerodynamic vanes 6 are joined only to one of the rings 1, 2 through two metallic flat bars 8 arranged one at each side of the aerodynamic vane 6.

Figure 4:
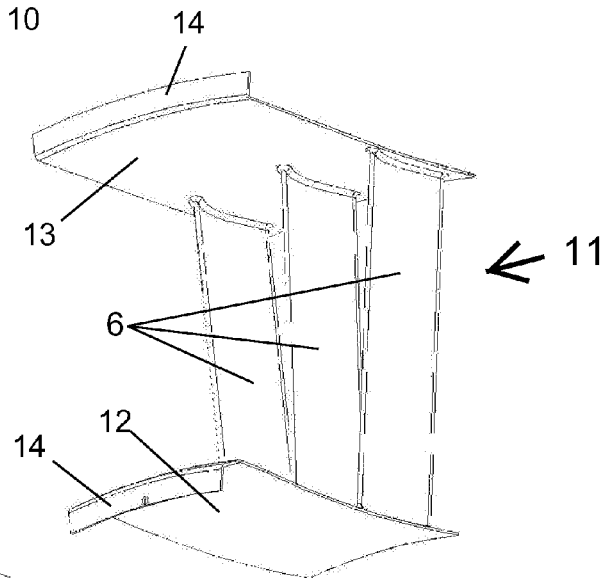
FIG. 4 is a perspective view of the grouping of aerodynamic vanes according to a particular embodiment through two membranes with flanges.
Figure 5:
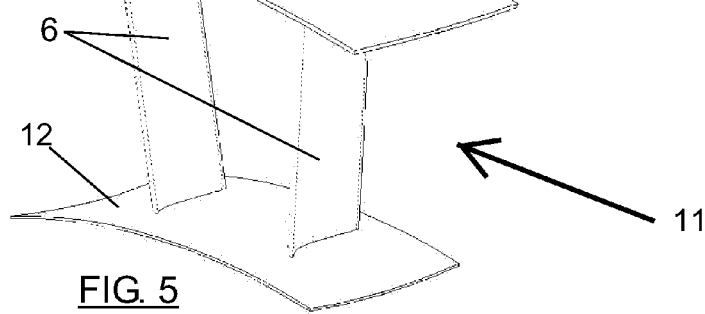
FIG. 5 is a perspective view of an alternative grouping of aerodynamic vanes through two membranes without flanges.
Figure 6:
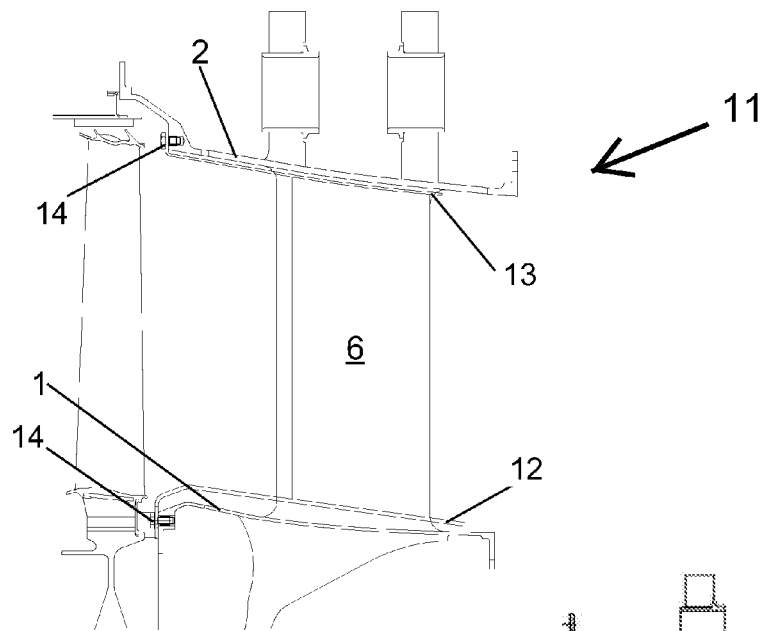
FIG. 6 is a longitudinal sectional view according to a particular embodiment of the union of the vanes to the rings, in which the aerodynamic vanes are joined through membranes in a rigid manner to the inner and outer ring.
Figure 7:
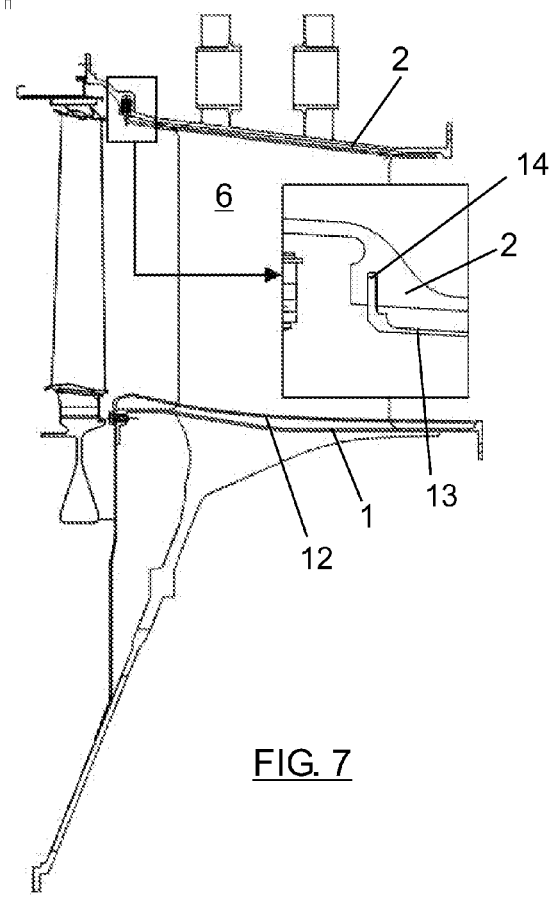
FIG. 7 is a longitudinal sectional view according to another particular embodiment of the union of the vanes to the rings, in which the aerodynamic vanes are joined through membranes in a rigid manner to the inner ring and in a detachable manner to the outer ring.

Alternatively to the metallic flat bars 8, the present invention has other means for joining the aerodynamic vanes 6 to the rings 1, 2. FIGS. 4 and 5 show the package grouping 11, of different aerodynamic vanes 6, preferably all those that are arranged between structural vanes by means of an inner membrane 12 which is fixed to one of their ends, and to the inner ring 1, and an outer membrane 13, which is fixed at the other end thereof and to the outer ring 2. As shown in FIGS. 4 and 6, according to a particular embodiment of the invention, the inner 12 and outer membranes 13 are rigidly fixed to the inner 1 and outer 2 rings, respectively through flanges 14 arranged at the edge of the membranes 12, 13. Alternatively, the packages 11 of aerodynamic vanes 6 are rigidly fixed to one of the two rings 1, 2 while they are joined to the other in a detachable way, through the introduction of a flange 14 in a groove to that purpose, and which enables the packages 11 of aerodynamic vanes 6 to move in a radial direction, favoring the aerodynamic properties of the support structure. FIG. 7 shows this embodiment, in which the packages 11 are rigidly fixed to the inner ring 1 and joined to the outer ring 2 in a detachable way. Furthermore, according to a different embodiment, one of the membranes 12, 13 is fixed to one of the rings 1, 2 while the other membrane 13, 12 is free from the other ring 2, 1, thus offering mobility to that end of the aerodynamic vanes.

According to different embodiments, the flanges 14 are eliminated to the membranes 12, 13, said membranes 12, 13 being integral to the rings 1, 2 when the packages 11 are fixed to them, or remain free.

FIG. 8 shows a particular embodiment of the invention in which the aerodynamic vanes 6 are divided into two parts, preferably at its central area, so that one of the parts is joined by any of the means described to the inner ring 1, and the other part is joined by any of the means described to the outer ring 2.

Once the invention has been clearly described, it is worth stating that the previously described embodiments can be subject to detail modifications as long as the main principle and essence of the invention are not modified.

The invention claimed is:

1. Bearing support structure for turbines comprising
an inner ring where the bearing is housed, and
an outer ring comprising anchoring points of an engine assembly containing a turbine,
wherein the inner ring and the outer ring are radially connected by means of a plurality of structural vanes in a circumference-like arrangement between both rings, which transmit the bearing loads to the anchoring points of the engine assembly in the outer ring, and through which service fluids go through between the inner ring and the outer ring, and
a plurality of aerodynamic vanes in a circumference-like arrangement between both rings, which straighten the main flow of the turbine,
wherein the aerodynamic vanes are lighter than the structural vanes, and wherein the number of structural vanes depends exclusively on
the bearing loads to be transmitted to the anchoring points of the engine assembly in the outer ring,
the amount and kind of service fluids which must go between the inner ring and the outer ring, and
wherein the number of aerodynamic vanes which are arranged and their section depend exclusively on the aerodynamic requirements demanded from the support structure for straightening of turbine main flow, and
wherein the structural vanes fulfill structural functions and the aerodynamic vanes fulfill aerodynamic functions;
wherein the aerodynamic vanes arranged between two structural vanes are grouped in packages by an inner membrane corresponding to the inner ring, to which said aerodynamic vanes are fixed at one of their ends, and an outer membrane, corresponding to the outer ring, to which the aerodynamic vanes are fixed at their other end, each one of the aerodynamic vane packages being joined to at least one of the rings;
wherein each one of the aerodynamic vane packages is fixed to the inner ring and the outer ring, the inner membrane being integral to said inner ring, and the outer membrane being integral to said outer ring.

2. Bearing support structure for turbines, according to claim 1, wherein the aerodynamic vanes are joined to at least one of the two rings through at least one L-section metallic flat bar, comprising
a first wing connected to the aerodynamic vane,
a second wing rigidly joined to the ring.

3. Bearing support structure for turbines, according to claim 2, wherein each one of the aerodynamic vanes is joined to the inner ring by two metallic flat bars, arranged one at each side of the aerodynamic vane,
and wherein each one of the aerodynamic vanes is joined to the outer ring by other two metallic flat bars, arranged one at each side of the aerodynamic vane.

4. Bearing support structure for turbines, according to claim 3, wherein
the first wings of the metallic flat bars joining the aerodynamic vanes to the inner ring are rigidly fixed to aerodynamic vanes, while
the first wings of the metallic flat bars joining the aerodynamic vanes to the outer ring rest against said aerodynamic vanes.

5. Bearing support structure for turbines, according to claim 3, wherein
the first wings of the metallic flat bars joining the aerodynamic vanes to the outer ring are rigidly fixed to said aerodynamic vanes, while
the first wings of the metallic flat bars joining the aerodynamic vanes to the inner ring rest against said aerodynamic vanes.

6. Bearing support structure for turbines, according to claim 2, wherein each one of the aerodynamic vanes is joined only to the inner ring by two metallic flat bars, arranged one at each side of the aerodynamic vane.

7. Bearing support structure for turbines, according to claim 2, wherein each one of the aerodynamic vanes is joined only to the outer ring by two metallic flat bars, arranged one at each side of the aerodynamic vane.

8. Bearing support structure for turbines, according to claim 1, wherein each one of the aerodynamic vane packages
is rigidly fixed to the inner ring by a flange arranged on an edge of the inner membrane, and
is joined in a detachable manner to the outer ring by a flange arranged on an edge of the outer membrane, which is introduced in a groove of said outer ring, enabling the aerodynamic vane packages to move in a radial direction.

9. Bearing support structure for turbines, according to claim 1, wherein each one of the aerodynamic vane packages is fixed to the inner ring by a flange arranged on an edge of the inner membrane, and the outer membrane being free from the outer ring.

10. Bearing support structure for turbines, according to claim 1, wherein each one of the aerodynamic vane packages is fixed to the outer ring by a flange arranged on an edge of the outer membrane, and the inner membrane being free from the inner ring.

11. Bearing support structure for turbines, according to claim 1, wherein each one of the aerodynamic vane packages is fixed to the inner ring, the inner membrane being integral to said inner ring, and the outer membrane being free from the outer ring.

12. Bearing support structure for turbines, according to claim 1, wherein each one of the aerodynamic vane packages is fixed to the outer ring, the outer membrane being integral to said outer ring, and the inner membrane being free from the inner ring.

13. Bearing support structure for turbines, according to claim 1, wherein the aerodynamic vanes arranged between two structural vanes are grouped in packages through only an inner membrane corresponding to the inner ring, to which said aerodynamic vanes are fixed at one of their ends.

14. Bearing support structure for turbines, according to claim 13, wherein each one of the aerodynamic vane packages is fixed to the inner ring by means of a flange arranged on an edge of the inner membrane, and the other end of the aerodynamic vane being free from the outer ring.

15. Bearing support structure for turbines, according to claim 13, wherein each one of the aerodynamic vane packages is fixed to the inner ring, being the inner membrane integral to said inner ring, and the other end of the aerodynamic vanes being free from the outer ring.

16. Bearing support structure for turbines, according to claim 1, wherein the aerodynamic vane arranged between two structural vanes are grouped in packages by means of only an outer membrane corresponding to the outer ring, to which said aerodynamic vanes are fixed at one of their ends.

17. Bearing support structure for turbines, according to claim 16, wherein each one of the aerodynamic vane packages is joined to the outer ring by means of a flange placed on the edge of the outer membrane, and the other end of the aerodynamic vanes being free from the inner ring.

18. Bearing support structure for turbines, according to claim 16, wherein each one of the aerodynamic vane packages is fixed to the outer ring, being the outer membrane integral to said outer ring, and the other end of the aerodynamic vanes being free from the inner ring.

19. A bearing support structure for turbines comprising
an inner ring where the bearing is housed, and
an outer ring comprising anchoring points of an engine assembly containing a turbine,
wherein the inner ring and the outer ring are radially connected by means of a plurality of structural vanes in a circumference-like arrangement between both rings, which transmit the bearing loads to the anchoring points of the engine assembly in the outer ring, and through which service fluids go through between the inner ring and the outer ring, and
a plurality of aerodynamic vanes in a circumference-like arrangement between both rings, which straighten the main flow of the turbine,
wherein the aerodynamic vanes are lighter than the structural vanes, and wherein the number of structural vanes depends exclusively on
the bearing loads to be transmitted to the anchoring points of the engine assembly in the outer ring,
the amount and kind of service fluids which must go between the inner ring and the outer ring, and
wherein the number of aerodynamic vanes which are arranged and their section depend exclusively on the aerodynamic requirements demanded from the support structure for straightening of turbine main flow, and
wherein the structural vanes fulfill structural functions and the aerodynamic vanes fulfill aerodynamic functions;
wherein the aerodynamic vanes arranged between two structural vanes are grouped in packages by an inner membrane corresponding to the inner ring, to which said aerodynamic vanes are fixed at one of their ends, and an outer membrane, corresponding to the outer ring, to which the aerodynamic vanes are fixed at their other end, each one of the aerodynamic vane packages being joined to at least one of the rings;
wherein each one of the aerodynamic vane packages is rigidly fixed to
the inner ring by means of a flange arranged on an edge of the inner membrane,
and the outer ring by means of a flange arranged on an edge of the outer membrane.

20. A bearing support structure for turbines comprising
an inner ring where the bearing is housed, and
an outer ring comprising anchoring points of an engine assembly containing a turbine,
wherein the inner ring and the outer ring are radially connected by means of a plurality of structural vanes in a circumference-like arrangement between both rings, which transmit the bearing loads to the anchoring points of the engine assembly in the outer ring, and through which service fluids go through between the inner ring and the outer ring, and
a plurality of aerodynamic vanes in a circumference-like arrangement between both rings, which straighten the main flow of the turbine,
wherein the aerodynamic vanes are lighter than the structural vanes, and wherein the number of structural vanes depends exclusively on
the bearing loads to be transmitted to the anchoring points of the engine assembly in the outer ring,
the amount and kind of service fluids which must go between the inner ring and the outer ring, and
wherein the number of aerodynamic vanes which are arranged and their section depend exclusively on the aerodynamic requirements demanded from the support structure for straightening of turbine main flow, and
wherein the structural vanes fulfill structural functions and the aerodynamic vanes fulfill aerodynamic functions;
wherein the aerodynamic vanes are divided into two parts, substantially at their central area, one of the parts being joined to the inner ring and the other part being joined to the outer ring.

* * * * *